United States Patent [19]

Radovich

[11] 4,217,026
[45] Aug. 12, 1980

[54] ELLIPTIC CYLINDRICAL BAFFLE ASSEMBLY

[75] Inventor: Danilo Radovich, Torrance, Calif.

[73] Assignee: The United States of America as represented by the Secretary of the Air Force, Washington, D.C.

[21] Appl. No.: 937,018

[22] Filed: Aug. 25, 1978

[51] Int. Cl.² .............................................. G02B 11/04
[52] U.S. Cl. .................... 350/58; 350/276 SL
[58] Field of Search ................. 350/58, 59, 17, 28, 350/319, 276 SL, 8, 293; 358/228, 229

[56] References Cited

U.S. PATENT DOCUMENTS

| | | | |
|---|---|---|---|
| 2,670,656 | 3/1954 | Braymer | 350/276 SL |
| 3,699,471 | 10/1972 | Mulready et al. | 350/276 SL |
| 3,905,675 | 9/1975 | McCracken | 350/17 |

FOREIGN PATENT DOCUMENTS 213315  9/1909  Fed. Rep. of Germany ............ 350/78

Primary Examiner—John K. Corbin
Assistant Examiner—B. Wm. de los Reyes
Attorney, Agent, or Firm—Joseph E. Rusz; Arsen Tashjian

[57] ABSTRACT

An assembly for baffling an associated optical system from off-axis radiation and, at the same time, reducing the thermal load by minimizing radiation absorption within the assembly. In its most basic embodiment, the assembly comprises: a rectangularly-shaped box-like housing having a specular internal surface; and, specular baffles that are sections of surfaces of hollow elliptic cylinders and that are positioned within the housing in spaced-apart relationship to each other and in a one-behind-the-other arrangement, and also are perpendicular to the sides of the housing.

5 Claims, 2 Drawing Figures

ELLIPTIC CYLINDRICAL BAFFLE ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to an elliptic cylindrical baffle assembly and, more particularly, to such an assembly that, in a preferred embodiment, is adapted for use with an optical system having an optical axis and a field of view.

In very sensitive optical systems, such as the one for which this invention has been adapted, it is essential to shade the entrance pupil from interferring sources that are outside the field of view, and to maintain the blackbody radiation of the housing below the threshold sensitivity of detector members of the optical system by keeping the housing cool.

Current practice is to use baffles and a housing that are black and, therefore, diffuse. However, since black surfaces are good absorbers and emitters of radiation, such surfaces have the inherent disadvtange of requiring elaborate cooling techniques which, in turn, put strain on power supplies and weight.

I have eliminated this prior art dilemma with my unique elliptic cylinrical baffle assembly; and, thereby, I have significantly advanced the state of the art.

SUMMARY OF THE INVENTION

This invention pertains to a light baffle assembly which prevents entry of off-axis light rays and, concurrently, substantially minimizes internal radiation, consequent heating, and resulting heat load.

Accordingly, the principal object of this invention is to teach the structure of such a unique light baffle assembly.

This principal object, as well as other related objects, of this invention will become readily apparent after a consideration of the description of the invention, together with reference to the Figures of the drawings.

DESCRIPTION OF THE PREFERRED EMBODIMENT

Figure 1:
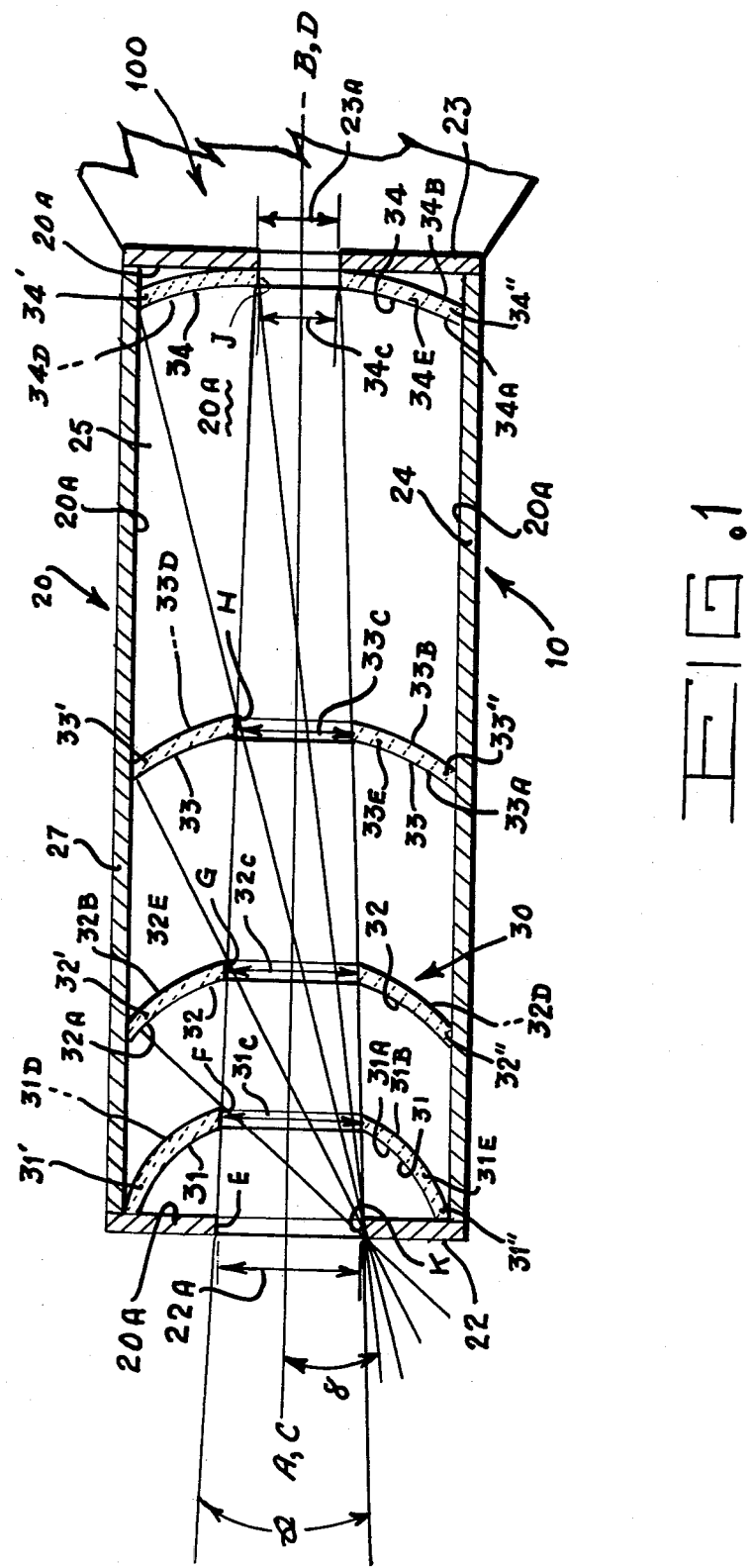
FIG. 1 is a side elevation view, in simplified schematic form and in cross section, of a preferred embodiment of the invention.
Figure 2:
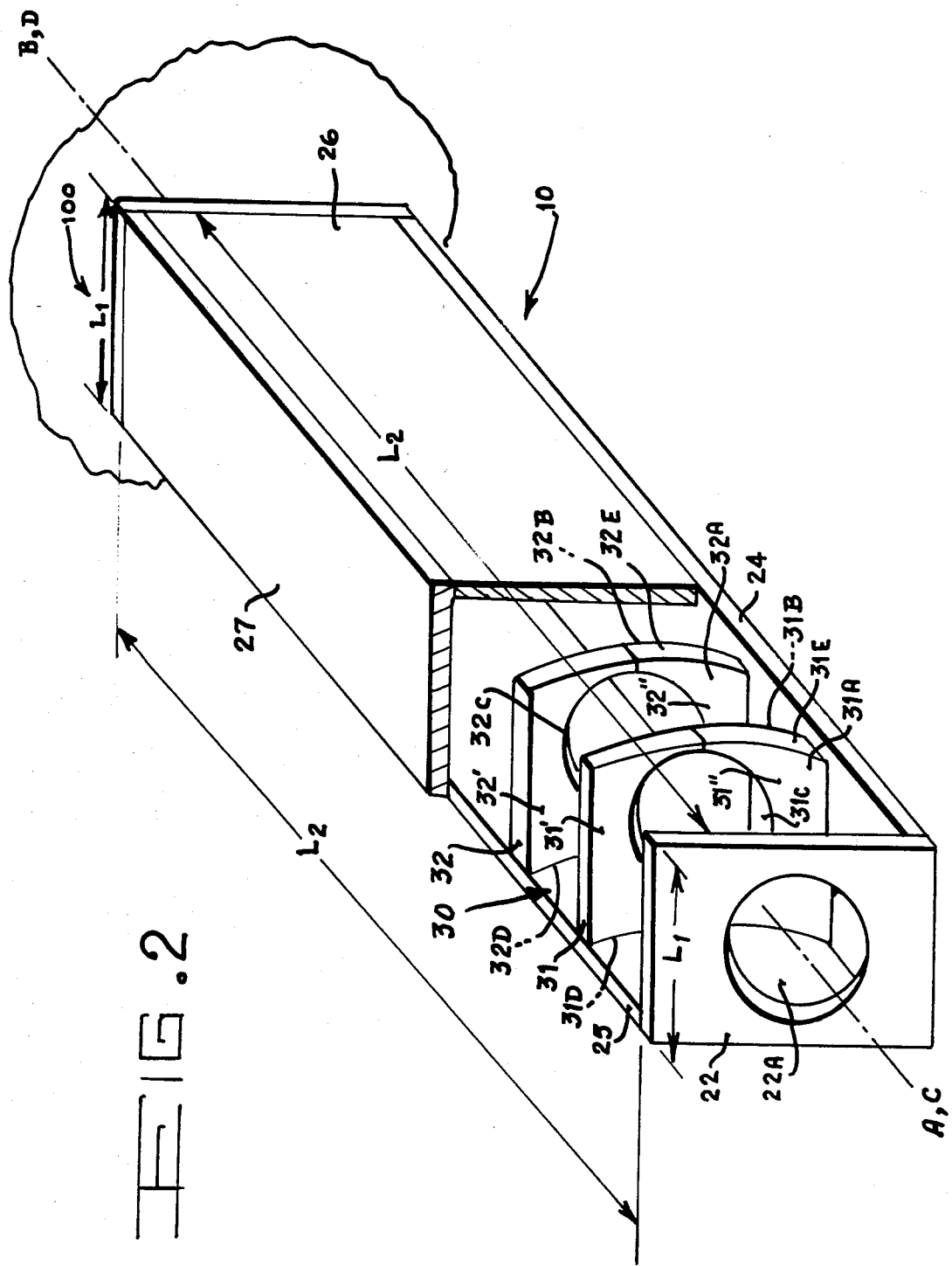
FIG. 2 is a perspective view, partially fragmented and in simplified pictorial form, of the preferred embodiment shown in FIG. 1.

With reference to FIGS. 1 and 2, therein is shown, in simplified form and in two views, the preferred embodiment 10 of my invention, as adapted for use with the associated optical system 100 which has an optical axis A-B and a field of view $\theta$.

My inventive elliptic cylindrical baffle assembly 10 has a longitudinal axis C-D, and comprises: a hollow, light impervious, completely closeable housing 20 having a specular (i.e., a mirrored or otherwise reflective) internal surface 20A, first end 22 with a first aperture 22A therein and therethrough, and a second end 23 with a second aperture 23A therein and therethrough, with these apertures 22A and 23A centered on, and disposed (in planes) perpendicular to, the optical system optical axis A-B and also the baffle assembly longitudinal axis C-D which are coincident (hereinafter referred to as the "coincident axis AC-BD"), and with these apertures 22A and 23A sized and shaped to accommodate the field of view $\theta$ of the optical system 100; and, a plurality 30 of baffles, such as 31, 32, 33 and 34, disposed within the housing 20, with each baffle of the plurality, such as 31, comprising two halves 31' and 31" each of which is a mirror image of the others and each of which is a section of a hollow elliptic cylinder (i.e., a right cylinder, each of whose two perpendicularly-disposed bases is an ellipse) having a specular (i.e., a mirrored or otherwise reflective) concave surface, such as 31A, a convex surface, such as 31B, and an aperture, such as 31C, interconnecting the concave and convex surfaces 31A and 31B of section (or baffle) 31' and 31" and with each baffle of the plurality 30 positioned within the housing 20 with its (the baffle's) concave surface (such as: 31A for baffle 31; 32A for baffle 32; 33A for baffle 33; and 34A for baffle 34) facing toward the first end 22 of the housing 20, and with its (the baffle's) convex surface (such as: 31B for baffle 31; 32B for baffle 32; 33A for baffle 33; and 34B for baffle 34) facing toward the second end 23 of the housing 20, and also with the respective apertures of the baffles (such as: 31C for baffle 31; 32C for baffle 32; 33C for baffle 33; and, 34C for baffle 34) centered on, and disposed perpendicular to, the coincident axis AC-BD, and further with the aperture in each baffle sized and shaped to accommodate (i.e., to accept and "fit") the field of view of the optical system 100.

As can be seen from FIGS. 1 and 2, the baffles 31–34, inclusive, are also disposed in spaced-apart relationship to each other, and simultaneously in a "one-behind-the-other" arrangement.

As a matter of preference, and not of limitation, the completely closeable housing 20 is box-like in structure, and includes: a flat bottom member 24; a first flat upright side member 22; a second flat upright side member 23 in parallel spaced relationship with and to the first flat upright side member 22; a third flat upright side member 25; a fourth flat upright side member 26 in parallel shaped relationship with and to the third flat upright side member 25; and, a cover-like flat top member 27 in parallel spaced relationship with and to the flat bottom member 24. It is here to be noted that the first flat upright side member 22 comprises the first end of the housing 20, and that the second flat upright side member 23 comprises the second end of the housing 20.

Also, as a matter of more particular preference, the box-like housing 20 is rectangularly-shaped, and all of the flat upright side members (i.e., 22, 23, 25 and 26) have lengths, with the first and second flat upright side members 22 and 23 having (or being of) equal lengths "L1", and with the second and third flat upright side members 25 and 26 having (or being of) equal lengths "L2" that are longer (i.e., greater) than the lengths "L1" of the first and second flat upright side members 22 and 23.

Additionally, each baffle has a first edge and a second edge (i.e., 31D and 31E for baffle 31; 32D and 32E for baffle 32; 33D and 33E for baffle 33; and, 34D and 34E for baffle 34), with the first edges 31D, 32D, 33D and 34D of the baffles perpendicular to the third flat upright side member 25, and with the second edges 31E, 32E, 33E and 34E of the baffles perpendicular to the fourth flat upright side member 26.

Further, as a matter of preference and not of limitation, the plurality 30 of elliptic cylindrical baffles comprises four of such baffles (i.e., 31, 32, 33 and 34).

MANNER OF OPERATION AND USE OF THE PREFERRED EMBODIMENT

The manner of operation (and of use) of the preferred embodiment 10, FIGS. 1 and 2, of the invention can be easily ascertained by any person of ordinary skill in the art from the foregoing description, coupled with reference to the Figures of the drawings.

For others, it is to be noted that my invention utilizes some familiar properties of a planar ellipse, namely: that, if a light ray passes through one focus of an ellipse, it will, after reflecting from the ellipse, pass through the other focus of the ellipse; and, that, if a ray of light passes between the two foci of the ellipse, it will return (i.e., come back) between the two foci.

It is to be remembered that baffles 31, 32, 33 and 34 are sections of elliptic cylindrical surfaces. These surfaces have focal lines located respectively, as shown in FIG. 1, at (E,K), (F,K), (G,K), (H,K) and (J,K,) for the top half such as 31' and similar focal lines for the bottom halves such as 31" which is a mirror image of 31'. Therefore, any light ray whose component is in the plane of the drawing, and that also makes an angle of $\gamma$ (i.e., a minimum rejection angle), or greater, with the optical axis A-B (or longitudinal axis C-D, or coincident axis AC-BD) will be rejected.

Stated another way, and still with reference to FIG. 1, any ray of light that is parallel to the plane of the drawing that comes in between points E and K, and that is incident on surface 31A of baffle 31', will be reflected back out between E and K, since baffle 31' is an ellipse with foci at E and K. Similarly, any ray that gets past point or foci F, and that hits surface 32A of baffle 32', will be reflected back out between the points F and K and, therefore, out of housing 20. The same holds for the rest of the elliptic cylindrical baffles, such as 33' and 34'. Rejection of skew rays of light is easily accomplished, because the internal surface of side walls 25 (FIGS. 1 and 2) and 26 (FIG. 2) are specular, and they (the walls 25 and 26) are also perpendicular to the ellipses (or elliptical surfaces). In other words, the component of the ray perpendicular to the side walls will be reflected back, while the component of the ray parallel to the side walls will be retroreflected by the appropriate elliptical surface, as previously explained. Of course, the bottom half 31" of baffle 31 operates in a similar manner.

CONCLUSION

It is abundantly clear from all of the foregoing, and from the Figures of the drawings, that the stated principal object of the invention, as well as other related objects, have been achieved.

It is to be noted that, although there have been described the fundamental and unique features of my invention as applied to a preferred embodiment thereof, various other embodiments, variations, adaptations, substitutions, additions, omissions, and the like may occur to, and can be made by, those of ordinary skill in the art, without departing from the spirit of the invention.

What is claimed is:

1. An elliptic cylindrical baffle assembly having a longitudinal axis, adapted for use with an optical system having an optical axis and a field of view, wherein said longitudinal axis of said baffle assembly and said optical axis of said optical system are coincident, comprising:
    a. a hollow, light impervious, completely closeable housing having a reflective internal surface, a first end with a first aperture therein and therethrough, and a second end with a second aperture therein and therethrough, with said first and second apertures centered on, and disposed perpendicular to, said coincident optical system optical axis and baffle assembly longitudinal axis, and with said apertures sized to accommodate said field of view of said optical system;
    b. and, a plurality of baffles disposed within said housing, wherein each baffle of said plurality comprises two symmetric halves each of which is a section of a hollow elliptic cylinder having a reflective concave surface, a convex surface, and an aperture interconnecting said concave and convex surfaces of said section, and wherein each baffle of said plurality is positioned within said housing with its said concave surface facing toward said first end of said housing and with its said convex surface facing toward said second end of said housing, and also wherein said apertures of said baffles are centered on, and are disposed in spaced-apart relationship to each other along and perpendicular to, said coincident optical system optical axis and baffle assembly longitudinal axis, and further wherein said apertures of said baffles are sized and shaped to accommodate said field of view of said optical system;
    whereby said optical system is baffled from any radiation that is off-axis with respect to said coincident optical system optical axis and baffle assembly longitudinal axis; and whereby, simultaneously, any radiation within said housing is substantially minimized, thereby reducing any thermal load on said baffle assembly and said optical system.

2. An elliptic cylindrical baffle assembly, as set forth in claim 1, wherein said completely closeable housing is box-like in structure, and includes a flat bottom member, a first flat upright side member, a second flat upright side member in parallel spaced relationship to said first flat upright side member, a third flat upright side member, a fourth flat upright side member in parallel spaced relationship to said third flat upright side member, and a cover-like flat top member in parallel spaced relationship to said flat bottom member, wherein said first flat upright side member comprises said first end of said housing and said second flat upright side member comprises said second end of said housing.

3. An elliptic cylindrical baffle assembly, as set forth in claim 2, wherein said box-like housing is rectangularly-shaped and all said flat upright side members have lengths, and wherein said first and second flat upright side members have equal lengths, and also wherein said third and fourth flat upright side members have equal lengths that are longer than said lengths of said first and second flat upright side members.

4. An elliptic cylindrical baffle assembly, as set forth in claim 3, wherein each baffle has a first edge and a second edge, and wherein said first edges of all of said baffles are perpendicular to said third flat upright side member, and also wherein said second edges of all of said baffles are perpendicular to said fourth flat upright side member.

5. An elliptic cylindrical baffle assembly, as set forth in claim 4, wherein said plurality of baffles comprises four baffles.

* * * * *